United States Patent [19]

Matsumoto et al.

[11] Patent Number: 5,710,837
[45] Date of Patent: Jan. 20, 1998

[54] BRANCH DELETION METHOD FOR THINNED IMAGE

[75] Inventors: Koji Matsumoto; Manabu Oosaka, both of Tokyo, Japan

[73] Assignee: Yozan Inc., Tokyo, Japan

[21] Appl. No.: 459,988

[22] Filed: Jun. 2, 1995

Related U.S. Application Data

[63] Continuation of Ser. No. 286,810, Aug. 4, 1994, abandoned, which is a continuation of Ser. No. 950,212, Sep. 24, 1992, abandoned.

Foreign Application Priority Data

Oct. 1, 1991 [JP] Japan ................................ 3-280439

[51] Int. Cl.⁶ .................................................. G06K 9/44
[52] U.S. Cl. ........................ 382/259; 382/173; 382/264
[58] Field of Search .................................. 382/173, 177, 382/171, 298, 259, 264, 260

[56] References Cited

U.S. PATENT DOCUMENTS

| | | | |
|---|---|---|---|
| 3,753,229 | 8/1973 | Beun et al. | 382/9 |
| 4,083,035 | 4/1978 | Riganati et al. | 382/27 |
| 4,491,960 | 1/1985 | Brown | 382/37 |
| 4,665,441 | 5/1987 | Sakaue et al. | 382/55 |
| 4,750,209 | 6/1988 | Shimura et al. | 382/48 |
| 4,856,074 | 8/1989 | Nagaoka | 382/48 |
| 5,142,589 | 8/1992 | Lougheed et al. | 382/55 |
| 5,146,511 | 9/1992 | Shirasaki | 382/55 |
| 5,164,996 | 11/1992 | Pastor | 382/55 |
| 5,202,933 | 4/1993 | Bloomberg | 382/33 |
| 5,224,179 | 6/1993 | Denker et al. | 382/55 |

OTHER PUBLICATIONS

Patent Abstracts of Japan, JP60019285, Jan. 1985.
Patent Abstracts of Japan, JP58027280, Feb. 1983.
Patent Abstracts of Japan, JP62194590, Aug. 1987.
Patent Abstracts of Japan, JP63221209, Sep. 1988.
Rosenfeld et al., "Digital Picture Processing", Academic Press, Inc., Second Edition, vol. 2, pp. 215–217 (1982).

Primary Examiner—Leo Boudreau
Assistant Examiner—Chris Kelley
Attorney, Agent, or Firm—Cushman, Darby & Cushman IP Group of Pillsbury Madison & Sutro LLP

[57] ABSTRACT

The present invention has an object to provide an image processing method for generating an image through thinning from which the topological characteristics of the image can be extracted more precisely and more accurately by deleting vestigial lines, that is, breaks in a line.

13 Claims, 3 Drawing Sheets

BRANCH DELETION METHOD FOR THINNED IMAGE

This is a continuation of application Ser. No. 08/286,810, filed on Aug. 4, 1994, which was abandoned upon the filing hereof which was a continuation of Ser. No. 07/950,212, filed Sep. 24, 1992, also abandoned.

BACKGROUND OF THE INVENTION

1. Field of the Invention

The present invention relates to a method for improved image processing.

2. Description of the Art

Though many methods have been proposed for thinning an image because of its effectiveness for clarifying the topological characteristics of an image, undesirable effects are often produced during a thinning process. For instance, the occurrence of vestigial lines, broken lines, or shrinking may occur during a thinning process. Consequently, an image obtained through thinning is far from an ideal one.

SUMMARY OF THE INVENTION

The present invention solves the above problems in the prior art and has an object of providing an image processing method for generating an image through thinning from which topological characteristics can be extracted more precisely and more accurately by avoiding vestigial lines, that is, unwanted lines.

The branch deletion method for generating a thinned image which relates to the present invention extracts a branch point and end point of a thinned image, breaks the thinned image by deleting the branch point, and deletes a short line from within the thinned image including an end point in the image whose branch point is broken.

It is therefore possible to generate an image through thinning whose topological characteristics are clarified by the present invention.

PREFERRED EMBODIMENT OF THE PRESENT INVENTION

Figure 2:
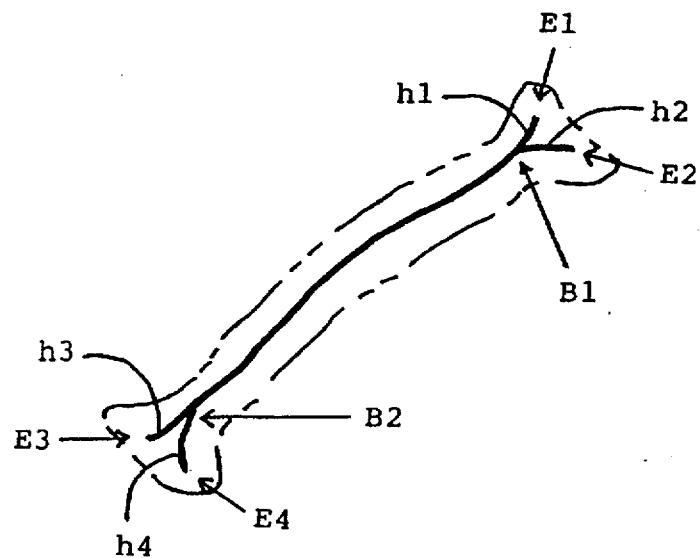
FIG. 2 shows a thinned image.

Hereinafter, an embodiment of the branch deletion method for thinned image relates to the present invention is described with reference to the attached drawings. FIG. 2 shows a simple thinned image. Performing thinning on an almost straight and uniform width image (shown by the chained double-dashed line), vestigial lines "h1", "h2", "h3" and "h4" are generated on both of the end parts. The vestigial lines "h1" and "h2" are the branches starting from the branch point "B1", whose end points are "E1" and "E2", respectively. The vestigial lines "h3" and "h4" are the branches starting from the branch point "B2", whose end points are "E3" and "E4", respectively.

Figure 1:
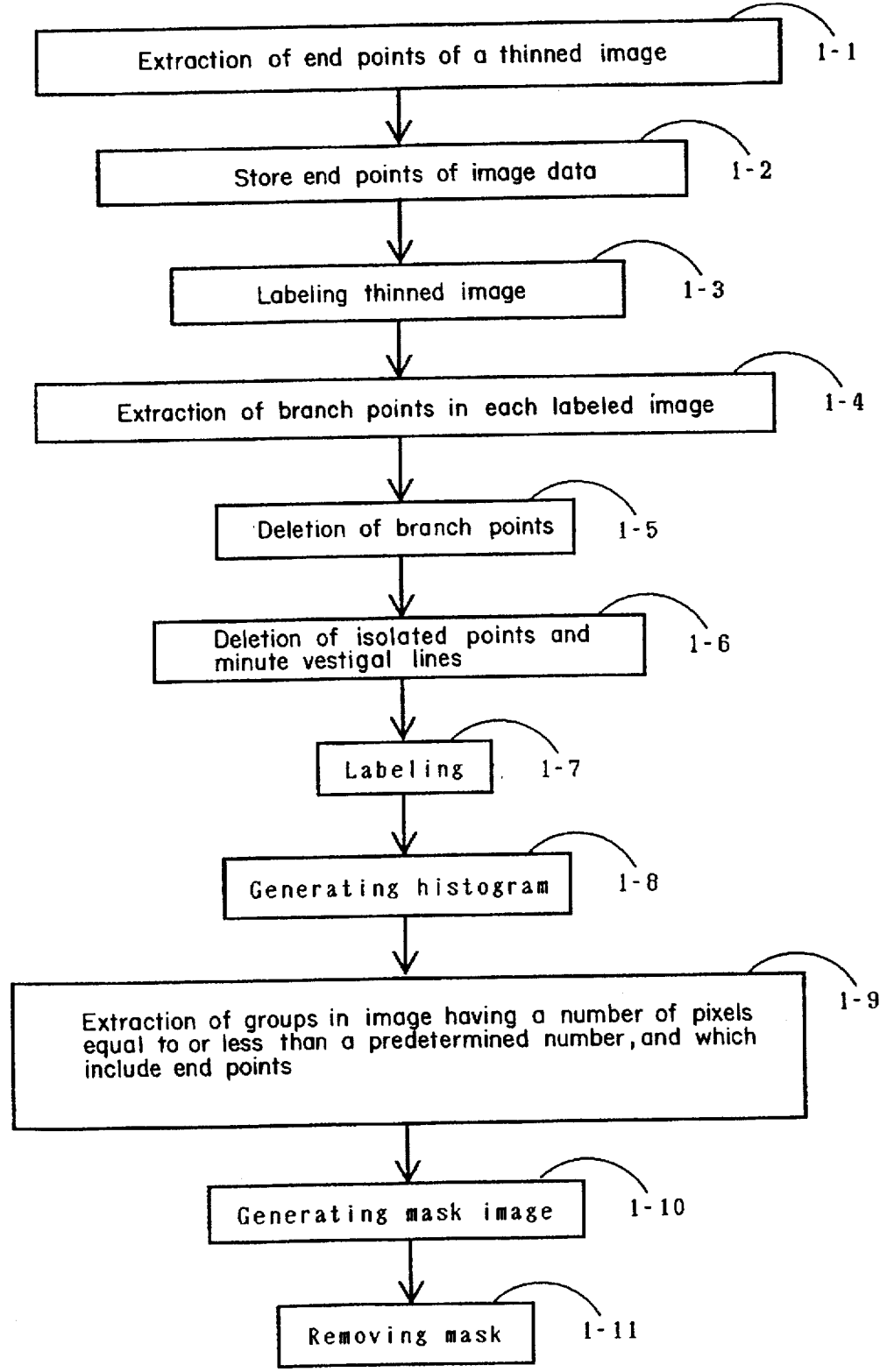
FIG. 1 shows a flowchart of an embodiment of the branch deletion method for a thinned image of the present invention.

The process of deleting the above vestigial lines of the thinned image is described with reference to the flowchart in FIG. 1 which is an embodiment of a branch deletion method according to the present invention.

In step 1-1, end points from "E1" to "E4" of the thinned image are extracted. One particular method for extracting the end points is based on patterns of pixels arranged in 3×3 matrices which are evaluated to determine the location of endpoints, points located at the end of a line. For instance, when a center pixel and only one other pixel among the pixels around the center pixel are activated (not background), the center pixel is an end point. Once located, an endpoint can be extracted by simply turning off the pixel corresponding thereto. The extracted end points are registered in an image memory as image data in step 1-2.

Figure 3:
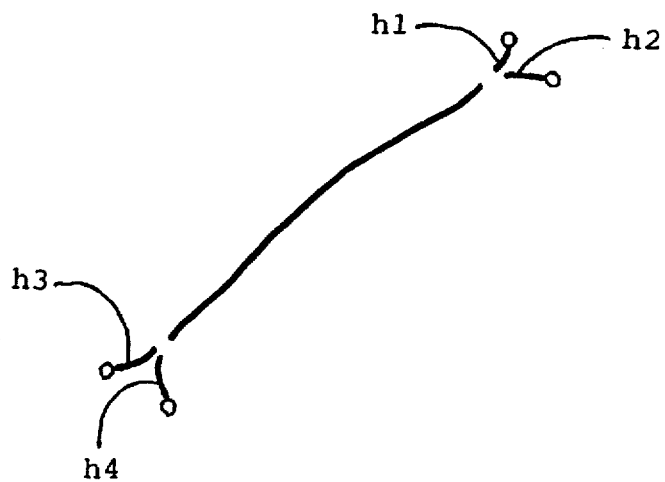
FIG. 3 shows an image like that shown in FIG. 2, wherein the branches are separated from the main body at branch points.

Each thinned image is labeled in step 1-3. When only one thinned image is produced from the original image as in FIG. 2, this labeling is pointless. However, actually, when multiple thinned images are produced from the original image, labeling is necessary to distinguish among them. Branch points of each labeled image are extracted in step 1-4 and the branch points are deleted in step 1-5. FIG. 3 shows that the branch points are cut off from the thinned image in FIG. 2: vestigial lines "h1" to "h4" are separated from the main line. Here individual points isolated from the main body are deleted in step 1-6 along with small groups of isolated pixels forming minute vestigial lines. Thus, labeling is performed again in order to identify each existing vestigial line in step 1-7.

In FIG. 3, vestigial lines from "h1" to "h4" include the end points described above. (The end points are shown with the mark "O". ) The existence of a substantial difference (i.e., a difference that helps to clearly distinguish one configuration from another) Between "h1" to "h4" and the main body "MB" depends on whether an end point is included or not. A histogram of the labeled image shown in FIG. 3 is generated in step 1-8. The number of pixels of each group, the respective labelled feature of the image, is counted by the histogram. It is equivalent to measurement of the length of each component of the thinned image. According to the histogram and end point data described above (step 1-2), an image of the line including end points with a number of pixels equal to or less than the predetermined number of pixels is extracted in step 1-9.

Figure 4:
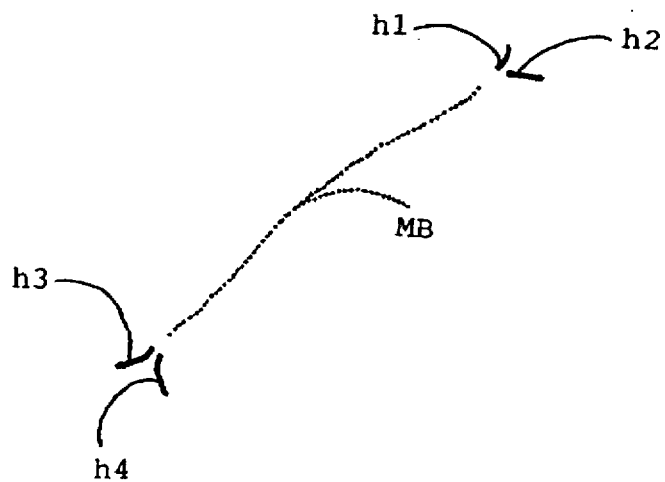
FIG. 4 shows an image of branches to be deleted.

From the image in FIG. 2, the extracted image consists of vestigial lines as shown in FIG. 4 which does not include main body "MB". In step 1-10, a mask image is generated based on the extracted vestigial lines, the mask image being used to eliminate the vestigial lines from the image. Two preferred methods for generating and applying a mask image are: (1) generating a mask image whose density of vestigial lines is set at "0" and the density of other parts of the image are set at "FF," and performing a bit-wise AND operation on the original thinned image (i.e., the image is inverted) and (2) selectively outputting the main body of the original image by controlling a multiplexer using the mask image.

Figure 5:
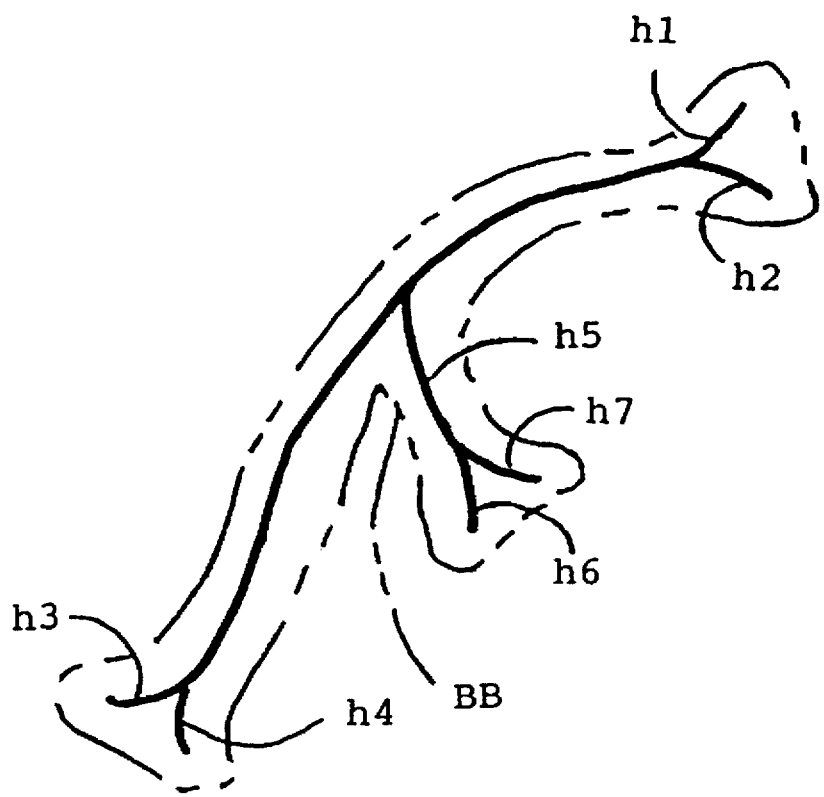
FIG. 5 shows another thinned image.

Concerning the original image with branch "BB" as shown in FIG. 5, the branch "h5" which may be considered to belong to a vestigial line is generated because of the existence of branch "BB" and should not be deleted, since it represents a significant feature of the configuration. Most such vestigial lines do not include end points and are rather long. Therefore, the branch can be omitted from the objects to be deleted by evaluating the length and the end point in steps 1 through 9.

Alternatively, in FIG. 5, vestigial lines "h6" and "h7" should be deleted. Because they do not exceed the predetermined length, they are deleted by masking to generate the image shown in FIG. 6.

Figure 6:
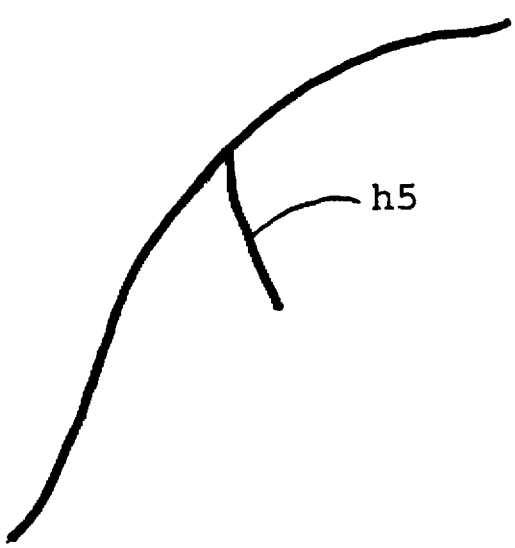
FIG. 6 shows an image that branches of FIG. 5 are deleted.

The vestigial lines including end points are deleted by the first deletion. In FIG. 6, "h5" itself without branches can be a branch. When "h5" is short branch, it can be deleted by the second deletion.

As mentioned above, it is possible to generate a thinned image clarifying the topological characteristics of an image because the steps for it are: i) branches and end points of the thinned image are extracted, ii) in the thinned image, a vestigial line is separated from its branch point, and iii) the separated short line is deleted with the end point.

What is claimed is:

1. A method of removing a branch from a thinned image having a plurality of pixels, said method comprising the steps of:

obtaining an electronic representation of said thinned image;

electronically identifying a branch point and an end point of said electronic representation of said thinned image, said branch point being part of a main body of said electronic representation of said thinned image, said branch point connecting a branch with said main body;

electronically separating said branch connected to said branch point from said main body, said branch being separated by deleting said branch point on said main body;

electronically determining a length of said separated branch based on a number of pixels between said branch point and said end point in said electronic representation of said thinned image;

electronically extracting said separated branch when said separated branch has a length equal to or less than a predetermined length; and electronically removing said extracted branch from said electronic representation of said thinned image.

2. The method of claim 1, said removing step comprising the steps of:

electronically generating a mask image of only said branch; and electronically deleting said branch from said electronic representation of said electronic representation of said thinned image by masking said thinned image with said mask.

3. The method of claim 1, said identifying step comprising the step of locating said end point using a convolution operation.

4. The method of claim 1, further comprising the step of labelling a plurality of electronic representations corresponding to a plurality of thinned images in an image.

5. The method of claim 1, said separating step comprising a step of electronically deleting said branch point from said electronic representation of said thinned image.

6. The method of claim 1, further comprising the steps of:

electronically deleting isolated points and minute lines from said electronic representation of said thinned image after electronically separating said branch from said main body; and electronically relabelling said thinned image after electronically deleting said isolated points and minute lines.

7. The method of claim 1, said extracting step comprising a step of electronically determining a length of said branch by generating a histogram of said line.

8. The method of claim 2, wherein:

said generating step comprises the step of electronically inverting a portion of said thinned image containing said branch; and said deleting step comprises the step of electronically performing a bit-wise logical AND operation using said electronic representation of said thinned image and said electronically inverted image portion.

9. The method of claim 2, said deleting step comprises a step of using a multiplexer to selectively output portions of said thinned image based on said mask image.

10. The method of claim 1, wherein said removal step is performed using a mask based on the extracted branch.

11. A method of removing a branch from a thinned image, said method comprising the steps of:

obtaining an electronic representation of said thinned image;

electronically identifying a main body and at least one branch in said electronic representation of said thinned image;

generating a mask based on said at least one identified branch by:

electronically separating said branch connected to a branch point from a main body of said electronic representation of said thinned image, said branch being separated by deleting said branch point on said main body;

electronically determining a length of said branch; and electronically extracting said branch from said electronic representation of said thinned image when said branch has a length equal to or less than a predetermined length; and electronically removing said extracted branch from said electronic representation using said mask.

12. The method of claim 11, wherein said identification step includes the step of identifying a branch point and an end point of said electronic representation of said thinned image, said branch point being part of said main body, and said branch point connecting said branch with said main body.

13. A method of removing a branch from a thinned image, said method comprising the steps of:

obtaining an electronic representation of said thinned image;

electronically identifying a branch point and an end point of said electronic representation of said thinned image, said branch point being part of a main body of said electronic representation of said thinned image, said branch point connecting a branch with said main body;

electronically separating said branch connected to said branch point from said main body, said branch being separated by deleting said branch point on said main body;

electronically determining a length of said separated branch based on a number of pixels between said branch point and said end point in said electronic representation of said thinned image;

electronically generating a mask based on said separated branch when said separated branch has a length equal to or less than a predetermined length; and electronically removing a portion of said electronic representation of said thinned image corresponding to said mask.

* * * * *